US012715398B2

(12) United States Patent
Lee et al.

(10) Patent No.: US 12,715,398 B2
(45) Date of Patent: Aug. 25, 2026

(54) VEHICLE AND METHOD OF CONTROLLING THE SAME

(71) Applicants: Hyundai Motor Company, Seoul (KR); Kia Corporation, Seoul (KR)

(72) Inventors: Kyeongyeon Lee, Seoul (KR); Joohyeok Park, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 143 days.

(21) Appl. No.: 18/414,874

(22) Filed: Jan. 17, 2024

(65) Prior Publication Data

US 2024/0383454 A1 Nov. 21, 2024

(30) Foreign Application Priority Data

May 16, 2023 (KR) ........................ 10-2023-0062774

(51) Int. Cl.

*B60T 7/22* (2006.01)
*G06T 7/20* (2017.01)
*G06V 20/58* (2022.01)
*G06V 40/10* (2022.01)

(52) U.S. Cl.

CPC .................. *B60T 7/22* (2013.01); *G06T 7/20* (2013.01); *G06V 20/584* (2022.01); *G06V 40/10* (2022.01); *G06T 2207/30196* (2013.01); *G06T 2207/30256* (2013.01); *G06T 2207/30261* (2013.01)

(58) Field of Classification Search

CPC ...... G06V 20/56; G06V 20/58; G06V 20/584; G06V 40/10; B60T 7/12; F16D 59/00; G06T 7/20; B60W 30/09; B60W 30/095; B60W 30/0956; B60W 30/18109

See application file for complete search history.

(56) References Cited

U.S. PATENT DOCUMENTS

2016/0154643 A1* 6/2016 Zhang ..................... H04L 67/34 717/169
2020/0108826 A1* 4/2020 Kim ................ B60W 30/18159
2021/0065538 A1* 3/2021 Tamura .................. G06V 20/58

* cited by examiner

*Primary Examiner* — Erin M Piateski
*Assistant Examiner* — John C Merino
(74) *Attorney, Agent, or Firm* — Banner & Witcoff, Ltd.

(57) ABSTRACT

Disclosed herein a vehicle and a method of controlling the same. The vehicle includes a front camera photographing a direction of travel of the vehicle, a brake controller configured to control a braking device to stop the vehicle, and a main controller configured to control the brake controller to stop the vehicle in response to a pedestrian traffic light placed at a crosswalk being green while the vehicle is turning right.

15 Claims, 5 Drawing Sheets

VEHICLE AND METHOD OF CONTROLLING THE SAME

CROSS-REFERENCE TO RELATED APPLICATION(S)

This application claims the benefit of Korean Patent Application No. 10-2023-0062774, filed on May 16, 2023, which application is hereby incorporated herein by reference.

TECHNICAL FIELD

The present disclosure relates to a vehicle and a method of controlling the same, and more particularly, to a vehicle capable of controlling the vehicle according to a signal from a pedestrian traffic light installed at a crosswalk in the presence of the crosswalk when the vehicle is turning right on a road, and a method of controlling the same.

BACKGROUND

In general, an advanced driver assistance system (ADAS) is a system that helps a driver drive a vehicle safely. The ADAS includes a variety of technologies designed to improve driving safety, user comfort, and efficiency.

The ADAS may use sensors, such as radar, light detection and ranging (LIDAR), and cameras to detect a vehicle's surroundings, and processes data obtained from the sensors to send a warning to a driver or automatically adjust the vehicle. For example, the ADAS may include a lane departure warning system (LDWS), an automatic emergency braking (AEB), an adaptive cruise control (ACC), a rear cross traffic alert (RCTA), and a lane keeping assist system (LKAS), and may also include an intelligent speed limit assist (ISLA), a manual speed limit assist (MSLA), a smart cruise control (SCC), or the like.

If there is a crosswalk when a vehicle is turning right at an intersection and a pedestrian light is green, the vehicle should stop and proceed. Also, in this case, if there is a pedestrian in the crosswalk, the vehicle is required to remain stopped until the pedestrian is out of the crosswalk. Fines and demerit points are imposed for violating such a rule on stopping when turning right.

SUMMARY

The following summary presents a simplified summary of certain features. The summary is not an extensive overview and is not intended to identify key or critical elements.

The present disclosure provides a vehicle configured for controlling the vehicle by identifying a pedestrian signal at a crosswalk and whether a pedestrian is present at the crosswalk while the vehicle is turning right at an intersection, and a method of controlling the same.

Additional features will be set forth in part in the description which follows and, in part, will be obvious from the description, or may be learned by practice of the disclosure.

A vehicle may comprise: at least one camera configured to capture at least one image, wherein the at least one image comprises: information indicating a moving direction of the vehicle; information indicating a crosswalk; and information indicating a status of a pedestrian traffic light placed at the crosswalk; a brake controller configured to control a braking device to stop the vehicle; and a main controller configured to: determine, based on the at least one image, the status of a pedestrian traffic light placed at the crosswalk; and control, based on the pedestrian traffic light being green and while the vehicle is moving toward the crosswalk by making a right turn, the brake controller to stop the vehicle before the vehicle reaches the crosswalk.

The main controller may be further configured to identify, based on the at least one image, the crosswalk and a signal of the pedestrian traffic light.

The vehicle may further comprise a detection sensor configured to detect an obstacle located around the vehicle, wherein the main controller is configured to determine, based on the at least one image and based on information detected by the detection sensor, whether a pedestrian is present at the crosswalk.

The main controller may be configured to control, based on a determination that a pedestrian is present at the crosswalk, the brake controller to control the vehicle to remain in a stopped state.

The main controller may be configured to control, based on a determination that a pedestrian is not present at the crosswalk, the brake controller to control the vehicle to be released from a stopped state.

The main controller may be further configured to control the brake controller to control the vehicle to make a temporary stop before reaching the crosswalk.

The main controller may be further configured to determine, based on a right turn signal of the vehicle being turned on, that the vehicle is making a right turn.

The vehicle may further comprise a storage storing map information about a location of the vehicle.

The main controller or at least one controller of the vehicle may be configured to determine whether version information on the map information is up-to-date and to update the map information.

The main controller may be further configured to identify, based on the at least one image and the map information, the crosswalk.

The main controller may be further configured to determine, based on the pedestrian traffic light being green, whether a pedestrian is present on the crosswalk and whether there is a pedestrian who attempts to cross the crosswalk. The main controller may be further configured to control, based on a determination that a pedestrian not being present on the crosswalk and a determination that there is no pedestrian who attempts to cross the crosswalk, the vehicle to make a right turn toward the crosswalk. The main controller may determine, based on the at least one image, whether there is a pedestrian moving toward the crosswalk from one of two areas each corresponding to one of the two ends of the crosswalk.

A method of controlling a vehicle may comprise: identifying, by a main controller and based on at least one image captured by at least one camera, a crosswalk, wherein the at least one image comprises: information indicating a moving direction of the vehicle; information indicating the crosswalk; and information indicating a status of a pedestrian traffic light placed at the crosswalk; determining, by the main controller and based on the at least one image, a signal of the pedestrian traffic light placed at the crosswalk; and while the vehicle is moving toward the crosswalk by making a right turn controlling, by the main controller and based on the pedestrian traffic light being green, a brake controller to control a braking device to stop the vehicle before the vehicle reaches the crosswalk.

The method may further comprise determining, by the main controller and based on the at least one image, the moving direction of the vehicle.

The method may further comprise: determining, based on the at least one image, whether a pedestrian is present at the crosswalk; and controlling, by the main controller and based on a determination that a pedestrian is present at the crosswalk, the brake controller to control the vehicle to remain in a stopped state.

The method may further comprise determining, based on the at least one image, whether a pedestrian is present at the crosswalk.

The method may further comprise controlling, by the main controller and based on a determination that a pedestrian is not present at the crosswalk, the brake controller to control the vehicle to be released from a stopped state.

The determining whether the pedestrian is present at the crosswalk may comprise: identifying, by the main controller and using the at least one image and information detected by a detection sensor that detects an obstacle located around the vehicle, the pedestrian being present at the crosswalk.

The controlling of the brake controller may comprise controlling the brake controller to control the vehicle to make a temporary stop before reaching the crosswalk.

The method may further comprise determining, by the main controller and based on a right turn signal of the vehicle being turned on, that the vehicle is making a right turn.

The identifying of the crosswalk may comprise: identifying, by the main controller and based on the at least one image and map information, the crosswalk, wherein the map information comprises map information about a location of the vehicle.

The method may further comprise determining, by the main controller or at last one controller of the vehicle, whether version information on the map information is up-to-date.

These and other features and advantages are described in greater detail below.

BRIEF DESCRIPTION OF THE DRAWINGS

These and/or other aspects of the disclosure will become apparent and more readily appreciated from the following description, taken in conjunction with the accompanying drawings, in which.

DETAILED DESCRIPTION

Figure 1:
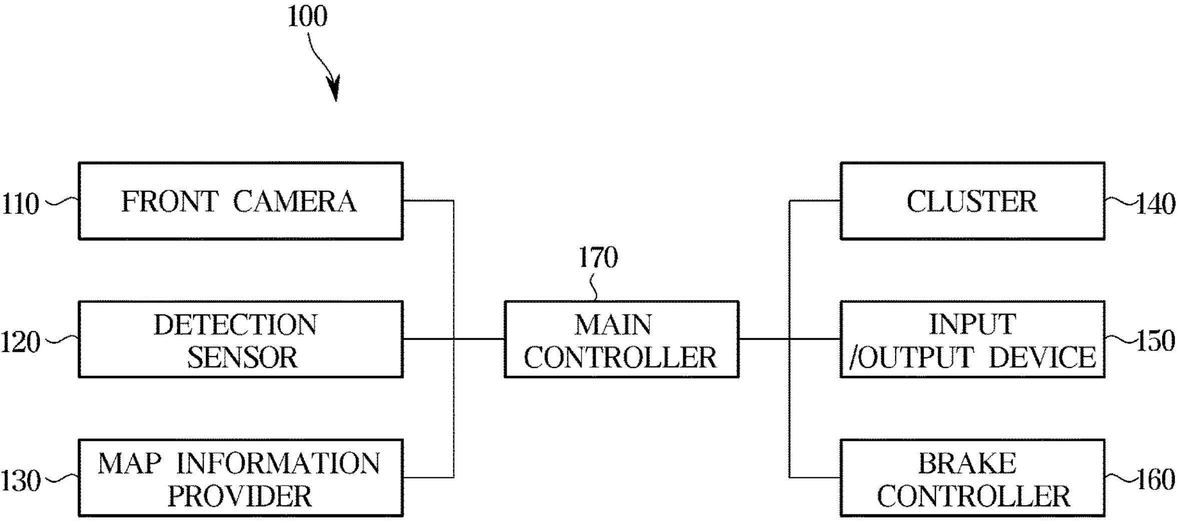
FIG. 1 is a block diagram illustrating a vehicle stop control device according to an embodiment of the disclosure.

Reference will now be made in detail to various examples of the disclosure. Examples of which are illustrated in the accompanying drawings, wherein like reference numerals refer to like elements throughout. This specification may not describe all elements of the disclosed embodiment(s) and detailed descriptions of what is well known in the art or redundant descriptions on substantially the same configurations may be omitted. The terms 'part', 'module', 'member', 'block' and the like as used in the specification may be implemented in software and/or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, various examples of the present disclosure will be described in detail with reference to the accompanying drawings.

Figure 2:
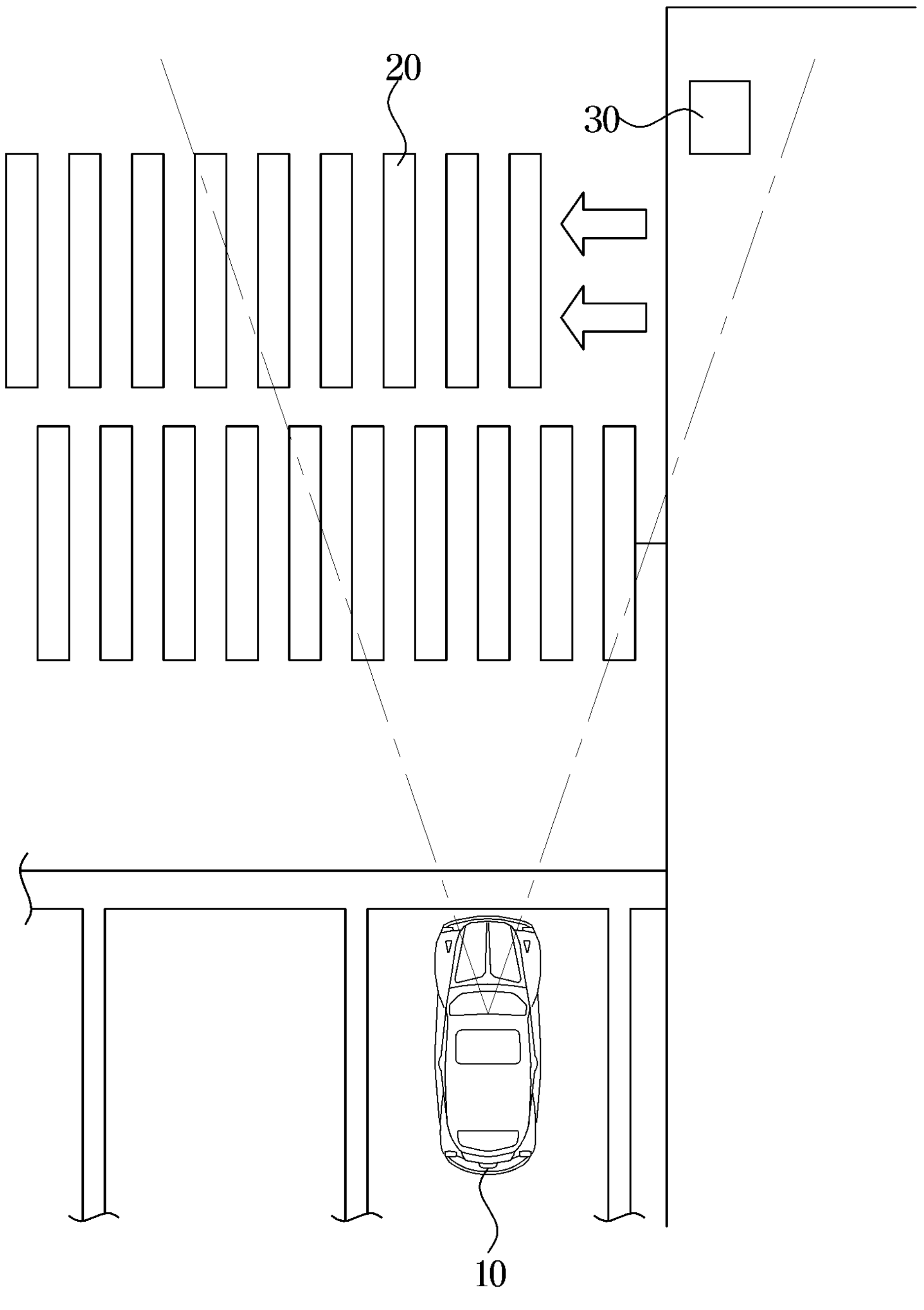
FIG. 2 is view for explaining the vehicle stop control device according to the embodiment of the disclosure.
Figure 3:
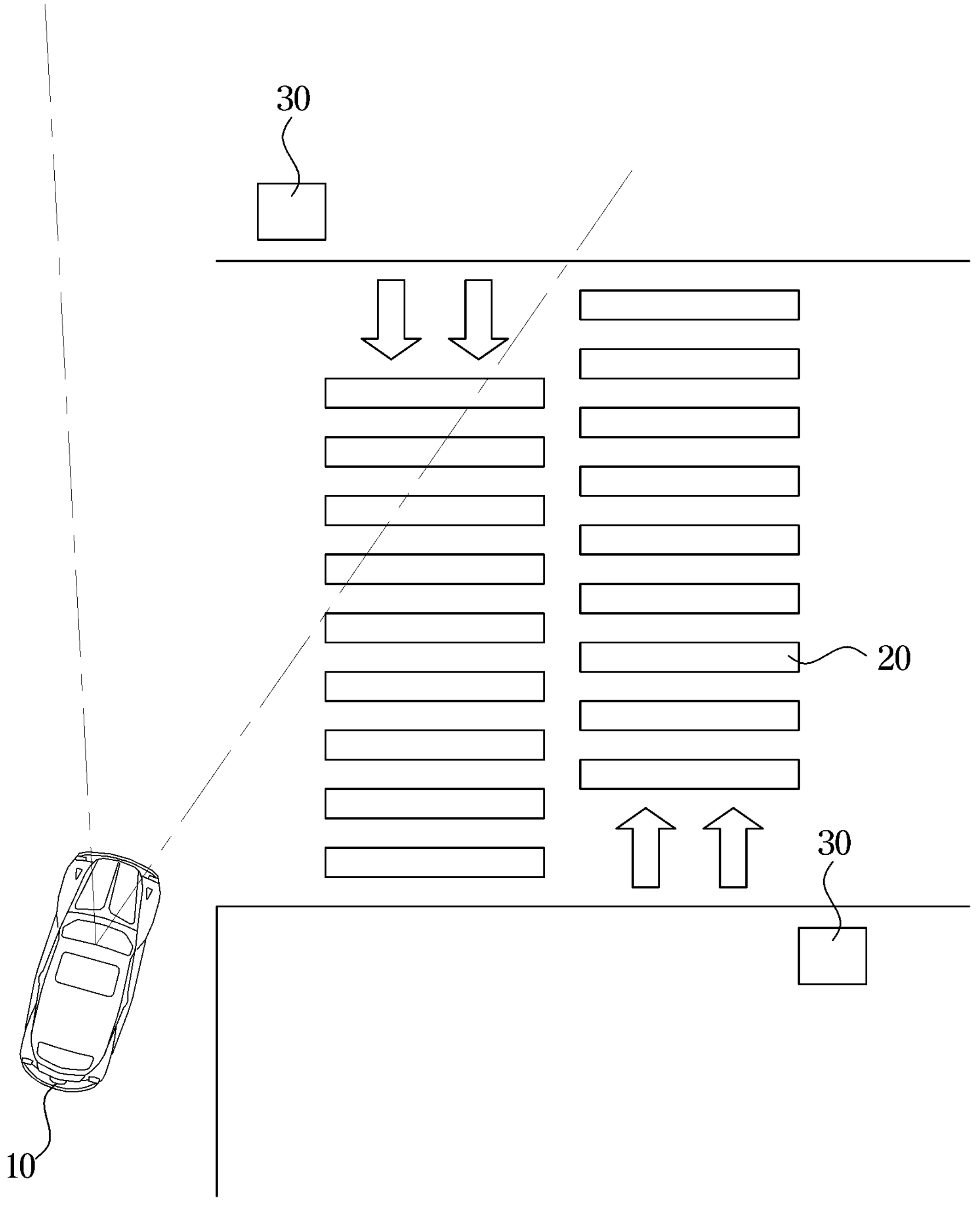
FIG. 3 is a flowchart illustrating a method of controlling a vehicle using the stop control device according to an embodiment of the disclosure.

With reference to FIGS. 1 to 3, a stop control device 100 of a vehicle 10 is described. The stop control device 100 of the vehicle 10 may recognize a pedestrian traffic light 30 at a crosswalk 20, identify the presence or absence of a pedestrian at the crosswalk 20, and control the vehicle 10 to stop. The stop control device 100 of the vehicle 10 may include one or more cameras (e.g., a front camera 110, a side camera, a rear camera, etc.), a detection sensor 120, a map information provider 130 (e.g., a navigation device, a GPS system, etc.), a cluster 140, an input/output device 150, a brake controller 160, and a main controller 170.

The front camera 110 may be installed in a front side of the vehicle 10 to capture at least one image in front of the vehicle 10. The front camera 110 may be mounted on a front bumper of the vehicle 10, and/or may be mounted on a windshield of the vehicle 10. The front camera 110 may capture at least one image in front of the vehicle 10 while the vehicle 10 is running, and the captured image may be used to identify a situation (e.g., a traffic situation, a traffic-related event, etc.) in front of the vehicle 10.

The front camera 110 may capture objects in a distance of about 80 m in a longitudinal direction of the front of the vehicle, and may capture objects in a width of about 20 m in a lateral direction.

The detection sensor 120 may be disposed on an exterior of the vehicle 10 and may detect the location of obstacles or people relative to the exterior of the vehicle 10. The detection sensor 120 may detect obstacles or people and other objects using ultrasonic waves, or radar, or other methods.

The map information provider 130 may store map information and identify information about a current location of the vehicle 10. To this end, the map information provider 130 may receive information about the location of the vehicle 10 from a navigation satellite. The map information provider 130 may identify map information about the surroundings of a location at which the vehicle 10 is located.

The cluster 140 may be disposed on an internal dashboard to allow the driver to identify the cluster from a driver's seat of the vehicle 10, and may display information that may directly identify a status of the vehicle 10, such as a speed and an engine revolutions per minute (RPM) of the vehicle 10. The cluster 140 may display an alarm to warn the driver.

The input/output device 150 may be disposed on the dashboard of the vehicle 10 and allow the user to input information or display various information. The input/output device 150 may display an image captured by the front camera 110, and may also display an image from other cameras mounted on the vehicle 10, as needed. For example, the input device may include a touch screen.

The brake controller 160 may control and monitor a braking device (or system) of the vehicle 10. To this end, the brake controller 160 may be controlled by the main controller 170 according to a braking force, speed, acceleration, distance between vehicles, and whether to collide with an obstacle in proximity to the vehicle 10, thereby controlling the braking system to allow the vehicle 10 to travel at a safe speed and to avoid collisions.

In an example, under the control of the main controller 17, the brake controller 160 may control a control system to temporarily stop the vehicle 10 in front of the crosswalk 20, or may control the control system to maintain a stopped state of the vehicle 10 in the presence of pedestrians at the crosswalk 20.

The main controller 170 may collect various pieces of information about the vehicle 10 and control various devices installed on the vehicle 10 based on the collected pieces of information. The main controller 170 may analyze an image collected by the front camera 110 and receive information about the surrounding situation from the detection sensor 120. The main controller 170 may collect map information about the location at which the vehicle 10 is located from the map information provider 130, and determine whether the vehicle 10 is adjacent to the crosswalk 20 based on the collected map information.

The main controller 170 may control the cluster 140 and the input/output device 150 to allow a visual warning signal to be displayed on one or more of the cluster 140 and the input/output device 150, and control the brake controller 160 to allow the brake controller 160 to control the braking system.

The main controller 170 may identify whether the vehicle 10 is located adjacent to the crosswalk 20 through the map information provider 130. The main controller 170 may analyze the image captured by the front camera 110 and determine whether the crosswalk 20 is located ahead. The main controller 170 may analyze the image captured by the front camera 110 and determine whether the pedestrian traffic light 30 at the crosswalk 20 is green.

Here, when the vehicle 10 is making a right turn, the crosswalk 20 may be placed before the vehicle 10 turns right, as shown in FIG. 2 and the crosswalk 20 may be placed after the vehicle 10 turns right, as shown in FIG. 3.

At the crosswalk 20, as shown in FIG. 2, the front camera 110 may capture at least one image including the pedestrian traffic light 30 placed on a sidewalk adjacent to the vehicle 10 from the side. However, the pedestrian traffic light 30 may be photographed from the vehicle 10 located on a roadway, so that the front camera 110 may photograph at least a portion of a signal of the pedestrian traffic light 30. The main controller 170 may identify the green and/or red colors of the pedestrian traffic light 30 by analyzing the image photographed by the front camera 110.

At the crosswalk 20, as shown in FIG. 3, the front camera 110 may capture at least one image including the pedestrian traffic light 30 disposed on the opposite side of the sidewalk adjacent to the vehicle 10. In this case, the front camera 110 may photograph the signal of the pedestrian traffic light 30 almost directly in front. The main camera may identify the signal of the pedestrian traffic light 30 by analyzing the image photographed by the front camera 110.

The main controller 170 may identify that the turn signal is turned on for the vehicle 10 to turn right. In response to a right turn signal of the vehicle 10 being turned on, the main controller 170 may identify that the vehicle 10 is turning right and control the brake controller 160 to allow the vehicle 10 to stop.

The main controller 170 may start controlling of the brake controller 160 to allow the vehicle 10 to stop regardless of manipulation by the driver, and may control one or more of the cluster 140 and the input/output device 150 to inform the driver that a stop control has started. Here, at the start of the stop control of the vehicle 10, the vehicle 10 may be temporarily stopped in front of the crosswalk 20. In this case, the vehicle 10 may be temporarily stopped without acceleration although the driver depresses an accelerator pedal.

A guidance on the stop control displayed on one or more of the cluster 140 and the input/output device 150 may be displayed for several seconds (e.g., about 4 seconds) under the control of the main controller 170.

The main controller 170 may identify whether a pedestrian is present at the crosswalk 20 and on the sidewalk adjacent to the crosswalk 20 by analyzing the image photographed by the front camera 110. Accordingly, when the pedestrian is present at the crosswalk 20 or on the sidewalk adjacent to the crosswalk 20, the main controller 170 may control the brake controller 160 to maintain the stop control of the vehicle 10. Here, the identification on whether the pedestrian presents on the sidewalk adjacent to the crosswalk 20 may be performed because there is a possibility that the pedestrian may enter the crosswalk 20.

Upon determining that the pedestrian at the crosswalk 20 or on the sidewalk adjacent to the crosswalk 20 is not present by analyzing the image photographed by the front camera 110, the main controller 170 may release the stop control of the vehicle 10. At this time (or before or after the release), the main controller 170 may control one or more of the cluster 140 and the input/output device 150 to inform the driver that the stop control has been released.

The main controller 170 may be implemented by one or more processors including a microprocessor, memory, etc.

Figure 4:
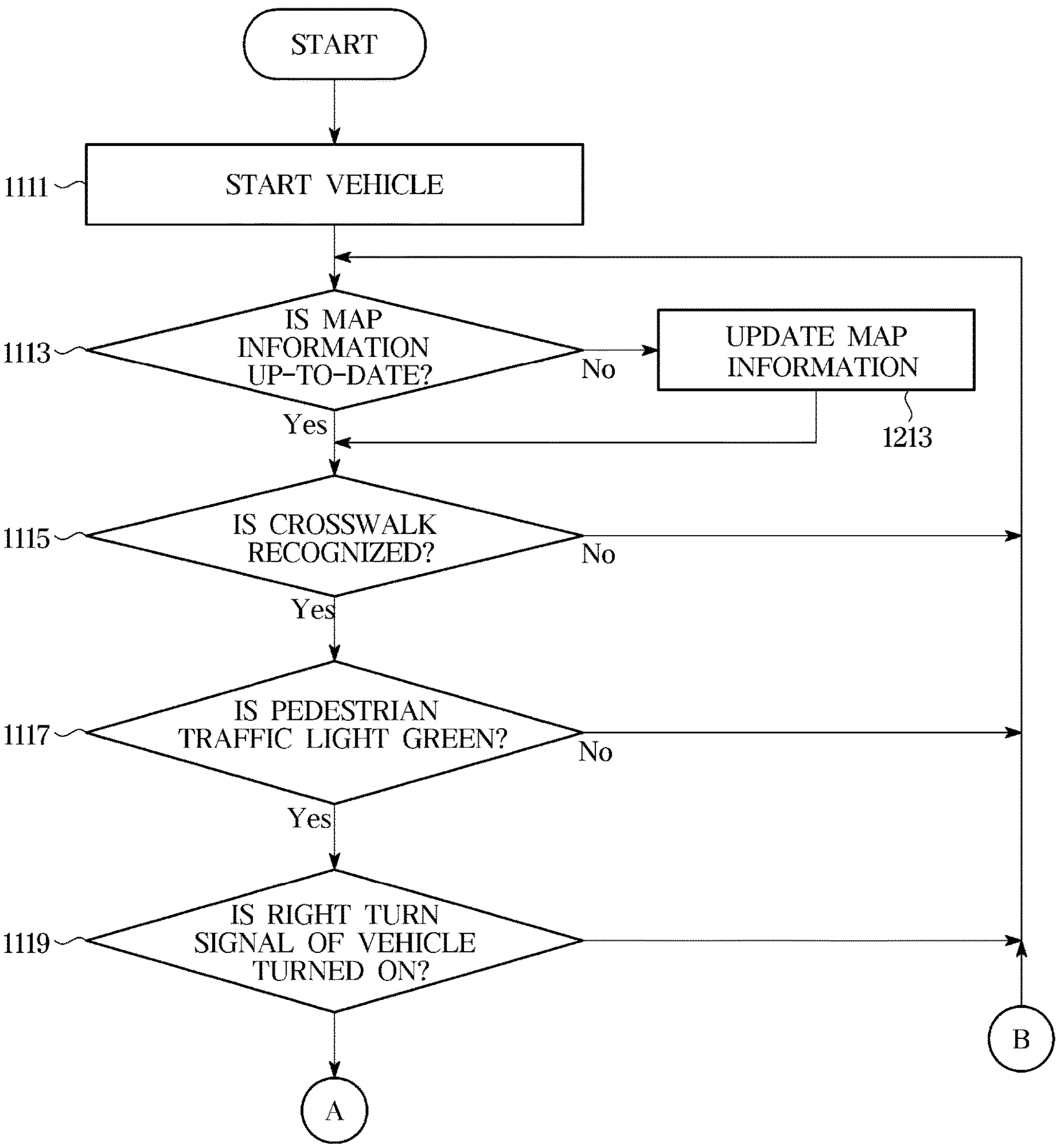
FIG. 4 and FIG. 5 are a flowchart illustrating the method of controlling the vehicle using the stop control device according to an embodiment of the disclosure.
Figure 5:
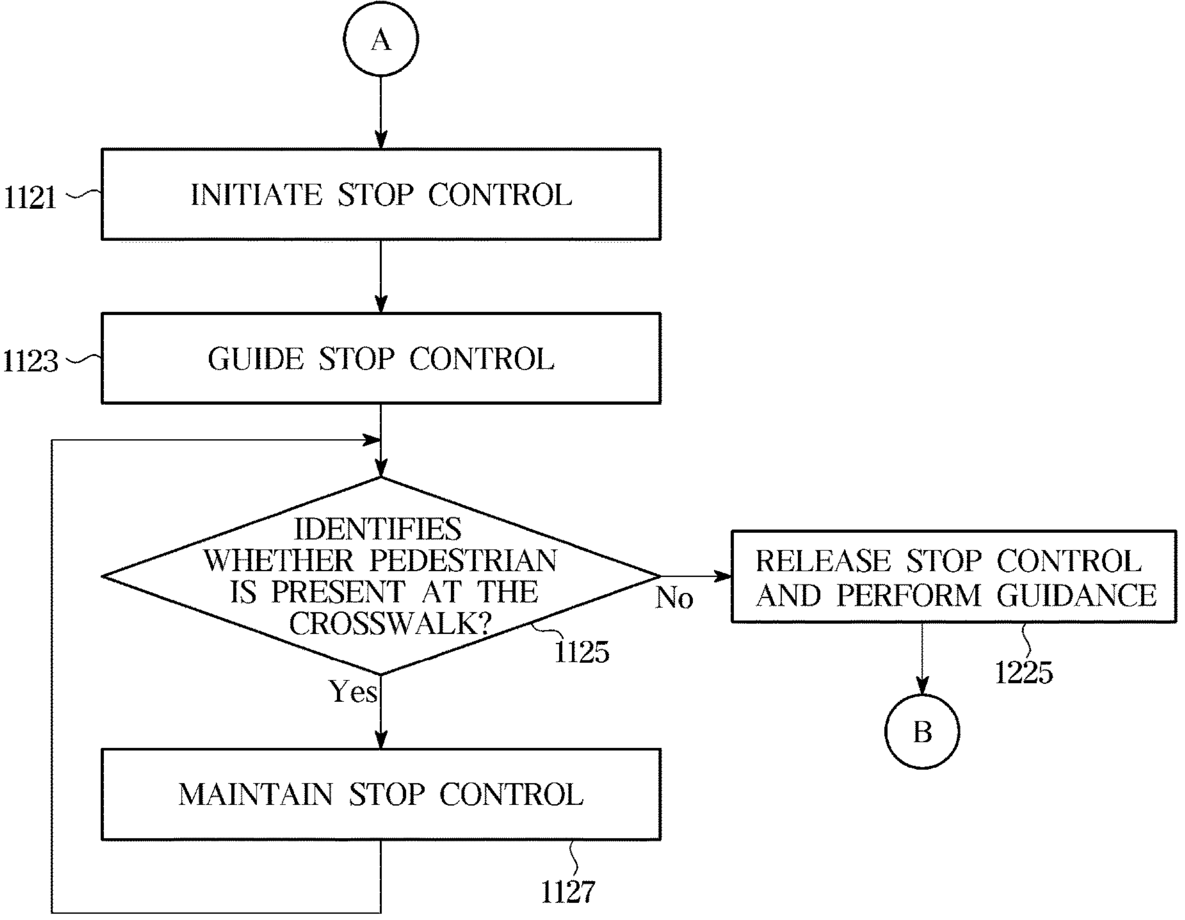

With reference to FIGS. 4 and 5, a method of controlling the vehicle 10 using the stop control device 100 will be described. The method of controlling the vehicle 10 will be described with reference to FIGS. 1 to 3.

The vehicle 10 is started for driving (e.g., in an autonomous driving mode or a manual driving mode) (1111).

In response to the vehicle 10 being started by the driver, the main controller 170 may collect the information (the at least image and the information indicated by the at least one image described above) from the front camera 110, information from the detection sensor 120, and the information from the map information provider 130 included in the stop control device 100 of the vehicle 10, and control the cluster 140, the input/output device 150, and the brake controller 160.

The map information provider 130 may determine whether the stored map information is up-to-date (1113).

The map information provider 130 may identify the version of the stored map information and determine whether a latest update is available. Accordingly, the map information provider 130 may identify whether the stored map information is up-to-date. The map information provider 130 may communicate with an external device via a communication device to identify whether a latest update of the map information exists.

The map information may be updated by communicating with the external device (e.g., a server) via communication (e.g., a wireless communication network, a mobile communication network, etc.) (1213).

The map information provider 130 may update the map information if a latest update of the stored map information exists. The map information provider 130 may download and update whether the latest version of the map information is available by communicating with the external device via a communication device. Accordingly, the map information provider 130 may be updated with information about a new construction and a change in location of the crosswalk 20.

The main controller 170 may determine whether the crosswalk 20 is recognized (1115).

The main controller 170 may determine whether the crosswalk 20 is present in front of the vehicle 10 by analyzing the image photographed by the front camera 110. Here, the front camera 110 may continuously (or periodically) photograph in front of the vehicle while the vehicle 10 is running, and the main controller 170 may identify whether the crosswalk 20 is present in a direction of travel of the vehicle 10 through analysis of the captured image. The main controller 170 may determine whether the crosswalk 20 is present in front of the vehicle 10 and to the right side of the vehicle 10 in the direction of travel.

While the vehicle 10 is travelling, the crosswalk 20 may be positioned across the direction of travel of the vehicle 10, as shown in FIG. 2, and may be positioned parallel to the direction of travel of the vehicle 10 on the right side of the direction of travel of the vehicle 10, as shown in FIG. 3. The front camera 110 may continuously (or periodically) photograph the images while the vehicle 10 is travelling, and the main controller 170 may identify each entire crosswalk 20 by analyzing the images photographed by the front camera 110 to.

In response to the crosswalk 20 being not recognized, the main controller 170 may proceed to a process of identifying whether the map information is up-to-date.

The main controller 170 may determine whether the pedestrian traffic light 30 at the crosswalk 20 is green (1117).

The main controller 170 may determine whether the pedestrian traffic light 30 at the recognized crosswalk 20 is green. To this end, the main controller 170 may identify the pedestrian traffic light 30 by analyzing the image photographed by the front camera 110. The main controller 170 may identify whether the pedestrian traffic light 30 is emitting green by distinguishing the color of the pedestrian traffic light 30 from the image photographed by the front camera 110, or identify whether the pedestrian traffic light 30 is emitting green by distinguishing an emitting location of the pedestrian traffic light 30.

In response to the pedestrian traffic light 30 not emitting green, the main controller 170 may proceed to the process of identifying whether the map information is up-to-date.

The main controller 170 may determine whether the right turn signal of the vehicle 10 is turned on (1119).

The main controller 170 may determine whether the right turn signal of the vehicle 10 is turned on by the driver, and accordingly, the main controller 170 may determine that the vehicle 10 is about to make a right turn.

In response to the right turn signal of the vehicle 10 not being turned on, the main controller 170 may proceed to the process of identifying whether the map information is up-to-date.

Here, the order of the process in which the main controller 170 determines whether the pedestrian traffic light 30 is green and the process in which the main controller 170 determines whether the right turn signal of the vehicle 10 is turned on may be changed.

The main controller 170 may initiate the stop control of the vehicle 10 in response to the pedestrian signal light 30 at the crosswalk 20 being green when the vehicle 10 is turning right (1121).

In the presence of the crosswalk 20 while the vehicle 10 is in the process of turning right, the main controller 170 may control the brake controller 160 to temporarily stop the vehicle 10 in response to the pedestrian signal light 30 at the crosswalk 20 being green. Accordingly, the brake controller 160 may control the braking system of the vehicle 10 to temporarily stop the vehicle 10. In this case, the vehicle 10 may be temporarily stopped without accelerating although the driver depresses the accelerator pedal.

The guidance of the stop control is performed on one or more of the cluster 140 and the input/output device 150 (1123).

At the start of the stop control of the vehicle 10, the main controller 170 may control one or more of the cluster 140 and the input/output device 150 to display the stop control guidance on at least one of the cluster 140 and the input/output device 150. The driver may receive the guidance regarding the stop control displayed on one or more of the cluster 140 and the input/output device 150.

The main controller 170 may determine whether the pedestrian is present at the crosswalk 20 (1125).

The main controller 170 may analyze the image photographed by the front camera 110 and may also identify whether the pedestrian is present at the crosswalk 20 through the detection sensor 120. The main controller 170 may determine whether the pedestrian is present at the crosswalk 20 or on the sidewalk adjacent to the crosswalk 20. Here, the determination of whether the pedestrian is present on the sidewalk adjacent to the crosswalk 20 is performed because there is a possibility that the pedestrian may enter the crosswalk 20.

In response to the absence of the pedestrian at the crosswalk 20, the stop control may be released and a guidance regarding the absence of the pedestrian at the crosswalk may be performed (1225).

Upon determining that no pedestrian is present at the crosswalk 20 by the front camera 110 and the detection sensor 120, the main controller 170 may control the brake controller 160 to release the stop control of the vehicle 10, and control one or more of the cluster 140 and the input/output device 150 to allow the stop control guidance to be performed.

As the main controller 170 releases the stop control, the driver (or an autonomous driving controller) may control the vehicle 10 to continue driving.

In response to the presence of the pedestrian at the crosswalk 20, the main controller 170 may maintain the stop control of the vehicle 10 (1127).

The main controller 170 may control the brake controller 160 to maintain the stop control of the vehicle 10 in response to the presence of the pedestrian at the crosswalk 20 by the front camera 110 and the detection sensor 120. Accordingly, the vehicle 10 may remain in a stopped state in front of the crosswalk 20.

In accordance with an example of the disclosure, a vehicle including a front camera photographing a direction of travel of the vehicle, a brake controller configured to control a braking device to stop the vehicle, and a main controller configured to control the brake controller to stop the vehicle in response to a pedestrian traffic light placed at a crosswalk being green while the vehicle is turning right.

The main controller may identify the crosswalk and a signal of the pedestrian traffic light by analyzing an image photographed by the front camera.

The vehicle may further include a detection sensor detecting an obstacle located around the vehicle, and wherein the main controller may analyze an image photographed by the front camera and identify whether a pedestrian is present at the crosswalk based on information detected by the detection sensor.

The main controller may control the brake controller to allow the vehicle to remain in a stopped state in response to the presence of the pedestrian at the crosswalk.

The main controller may control the brake controller to allow the vehicle to be released from a stopped state in response to the absence of the pedestrian at the crosswalk.

The main controller may control the brake controller to allow the vehicle to temporarily stop.

The main controller may recognize that the vehicle is turning right in response to a right turn signal of the vehicle being turned on.

The vehicle may further include a map information provider including map information about a location of the vehicle.

The map information provider may identify whether version information on the map information is the latest information and to update the map information.

The main controller may recognize the crosswalk using a result of analyzing an image photographed by the front camera and the map information included in the map information provider.

In accordance with another example of the disclosure, a method of controlling a vehicle is provided. The method includes identifying, by a main controller, a crosswalk while the vehicle is turning right, identifying, by the main controller, that a signal of a pedestrian traffic light placed at the crosswalk is green, controlling, by the main controller, a brake controller which controls a braking device to allow the vehicle to stop.

The identifying of the crosswalk may include analyzing and identifying, by the main controller, an image photographed by a front camera which photographs a direction of travel of the vehicle.

The identifying of the signal of the pedestrian traffic light may include analyzing and identifying, by the main controller, the image photographed by the front camera.

The method may further include identifying whether a pedestrian is present at the crosswalk, controlling, by the main controller, the brake controller to allow the vehicle to remain in a stopped state in response to the presence of the pedestrian at the crosswalk.

The method may further include controlling, by the main controller, the brake controller to allow the vehicle to be released from a stopped state in response to the absence of the pedestrian at the crosswalk.

The identifying whether the pedestrian is present at the crosswalk may include identifying, by the main controller, using at least one of information from analyzing an image photographed by a front camera that photographs a direction of travel of the vehicle and information detected by a detection sensor that detects an obstacle located around the vehicle.

The controlling of the brake controller may include controlling the brake controller to allow the vehicle to temporarily stop.

The right turning of the vehicle may be identified by the main controller as the vehicle is turning right in response to a right turn signal of the vehicle being turned on.

The identifying of the crosswalk may include identifying, by the main controller, using at least one of information from analyzing an image photographed by a front camera that photographs a direction of travel of the vehicle and information of a map information provider including map information about a location of the vehicle.

The method may further include identifying, by the map information provider, whether version information on the map information is the latest information.

As is apparent from the above, a vehicle may identify the signal of the crosswalk and control one or more driving devices of the vehicle to temporarily stop when the vehicle turns right at the intersection, thereby preventing accidents that may occur at the crosswalk and complying with the law.

Further, the vehicle may determine whether the pedestrian is present at the crosswalk and one or more driving devices of the vehicle may be controlled so that the vehicle remains in a stopped state, thereby preventing safety accidents that may occur at crosswalks.

The above-described examples may be implemented in the form of a recording medium storing instructions executable by one or more processors of a computer or any other computing devices. The instructions may be stored in the form of program code. When the instructions are executed by a processor, a program module is generated by the instructions so that the operations of the disclosed embodiment(s) may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although various examples of the disclosure have been shown and described, it would be appreciated by those having ordinary skill in the art that changes may be made in the embodiment(s) described herein without departing from the principles and spirit of the disclosure, the scope of which is defined in the claims and their equivalents.

What is claimed is:

1. A vehicle comprising:

at least one camera configured to capture at least one image, wherein the at least one image comprises:
- information indicating a moving direction of the vehicle;
- information indicating a crosswalk; and
- information indicating a status of a pedestrian traffic light placed at the crosswalk;

a detection sensor configured to detect an obstacle located around the vehicle;

a brake controller configured to control a braking device to stop the vehicle; and a main controller configured to:
- determine, based on the at least one image, the status of the pedestrian traffic light placed at the crosswalk; and control, based on the pedestrian traffic light being green and while the vehicle is moving toward the crosswalk by turning right, the brake controller to stop the vehicle before the vehicle reaches the crosswalk by controlling the brake controller to control the vehicle to make a temporary stop before reaching the crosswalk irrespective of manipulation by a driver of the vehicle, wherein the main controller is further configured to:

determine, based on the at least one image and based on information detected by the detection sensor, whether a pedestrian is present at the crosswalk; and control, based on a determination that the pedestrian is not present at the crosswalk, the brake controller to control the vehicle to be released from a stopped state, and wherein the main controller is further configured to:

determine, based on the at least one image, whether there is at least one pedestrian moving toward the crosswalk, and control, based on no pedestrian attempting to cross the crosswalk, the vehicle to turn right toward the crosswalk.

2. The vehicle of claim 1, wherein the main controller is further configured to identify, based on the at least one image, the crosswalk and a signal of the pedestrian traffic light.

3. The vehicle of claim 1, wherein the main controller is configured to control, based on a determination that at least one pedestrian is present at the crosswalk, the brake controller to control the vehicle to remain in the stopped state.

4. The vehicle of claim 1, wherein the main controller is further configured to determine, based on a right turn signal of the vehicle being turned on, that the vehicle is turning right.

5. The vehicle of claim 1, further comprising a storage storing map information about a location of the vehicle.

6. The vehicle of claim 5, wherein the main controller or at least one controller of the vehicle is configured to determine whether version information on the map information is up-to-date and to update the map information.

7. The vehicle of claim 5, wherein the main controller is further configured to identify, based on the at least one image and the map information, the crosswalk.

8. A method of controlling a vehicle, the method comprising:

identifying, by a main controller and based on at least one image captured by at least one camera, a crosswalk, wherein the at least one image comprises:

information indicating a moving direction of the vehicle;

information indicating the crosswalk; and information indicating a status of a pedestrian traffic light placed at the crosswalk;

determining, based on the at least one image, whether a pedestrian is present at the crosswalk, wherein the determining whether the pedestrian is present at the crosswalk comprises identifying, by the main controller and using the at least one image and information detected by a detection sensor that detects an obstacle located around the vehicle, the pedestrian being present at the crosswalk;

determining, by the main controller and based on the at least one image, a signal of the pedestrian traffic light placed at the crosswalk; and while the vehicle is moving toward the crosswalk by turning right, controlling, by the main controller and based on the pedestrian traffic light being green, a brake controller to control a braking device to stop the vehicle before the vehicle reaches the crosswalk, wherein the controlling of the brake controller comprises controlling the brake controller to control the vehicle to make a temporary stop, before reaching the crosswalk, irrespective of manipulation by a driver of the vehicle, wherein the method further comprises controlling, by the main controller and based on a determination that the pedestrian is not present at the crosswalk, the brake controller to control the vehicle to be released from a stopped state, and wherein the method further comprises:

determining, based on the at least one image, whether there is at least one pedestrian moving toward the crosswalk, and controlling, based on no pedestrian attempting to cross the crosswalk, the vehicle to turn right toward the crosswalk.

9. The method of claim 8, further comprising determining, by the main controller and based on the at least one image, the moving direction of the vehicle.

10. The method of claim 8, further comprising:

controlling, by the main controller and based on a determination that the pedestrian is present at the crosswalk, the brake controller to control the vehicle to remain in the stopped state.

11. The method of claim 8, further comprising determining, by the main controller and based on a right turn signal of the vehicle being turned on, that the vehicle is turning right.

12. The method of claim 8, wherein the identifying of the crosswalk comprises:

identifying, by the main controller and based on the at least one image and map information, the crosswalk, wherein the map information comprises map information about a location of the vehicle.

13. The method of claim 12, further comprising determining, by the main controller or at least one controller of the vehicle, whether version information on the map information is up-to-date.

14. The method of claim 8, wherein the controlling of the brake controller to control the vehicle to make the temporary stop comprises:

controlling the brake controller to control the vehicle to automatically initiate the temporary stop, at a predetermined distance from the crosswalk, by overriding an acceleration associated with the manipulation by the driver; and outputting, to the driver, a notification indicating that a stop control has started.

15. The vehicle of claim 1, wherein the main controller is further configured to control the brake controller to control the vehicle to make the temporary stop by controlling the brake controller to control the vehicle to automatically initiate the temporary stop, at a predetermined distance from the crosswalk, by overriding an acceleration associated with the manipulation by the driver, and wherein the main controller is further configured to output, to the driver, a notification indicating that a stop control has started.

* * * * *